United States Patent [19]
Ma

[11] Patent Number: 5,193,051
[45] Date of Patent: Mar. 9, 1993

[54] SLIDING BOX TYPE PEN BASE COMPUTER WITH LCD AND MOTHER BOARD IN A BASE AND WITH BATTERY, POWER SUPPLY, AND DISK DRIVES IN A SLIDING BOX

[76] Inventor: Hsi-Kuang Ma, 4F, No. 48, Sec. 2, Chung Cherng Road, Taipei, Taiwan

[21] Appl. No.: 872,026

[22] Filed: Apr. 22, 1992

[51] Int. Cl.⁵ .......................... H05K 7/10; G06F 1/16
[52] U.S. Cl. ...................................... 361/393; 361/380
[58] Field of Search ................ 364/708; 361/380, 390, 361/391, 392, 393, 394, 395, 399

[56] References Cited

U.S. PATENT DOCUMENTS

| | | |
|---|---|---|
| 4,680,674 | 7/1987 | Moore ................................. 361/395 |
| 4,894,792 | 1/1990 | Mitchell et al. ...................... 364/708 |
| 4,926,365 | 5/1990 | Hsieh ................................... 364/708 |

Primary Examiner—Leo P. Picard
Assistant Examiner—Michael W. Phillips
Attorney, Agent, or Firm—Bacon & Thomas

[57] ABSTRACT

A sliding box type pen base computer consists of a base and a sliding box, wherein the base comprises a mother board and a liquid crystal display supported on two longitudinal side stands with receiving chamber defined therein to receive the sliding box; the sliding box is made to slide in and out of the base, and comprises a battery box, a power supply unit, a floppy diskdrive and a hard diskdrive on the inside surrounded by a vertical peripheral wall and electrically connected to the base.

1 Claim, 1 Drawing Sheet

SLIDING BOX TYPE PEN BASE COMPUTER WITH LCD AND MOTHER BOARD IN A BASE AND WITH BATTERY, POWER SUPPLY, AND DISK DRIVES IN A SLIDING BOX

BACKGROUND OF THE INVENTION

The present invention relates to pen base computers, and more particularly, the present invention relates to a sliding box type pen base computer.

A variety of portable computers are known and widely used for the advantage of mobility. A pen base computer is a newly developed compact computer which has a LCD for graphic input through a pen. Because the keyboard input device is not provided, the size of a pen base computer is greatly reduced. Since a pen base computer is very small (may be so small that it can be held in the palm), the master board and the LCD thereof may be damaged easily when frequently opening and closing the outer shell (opening the outer shell may cause a static electricity to happen, which will affect the operation of the electronic elements therein).

It is therefore the main object of the present invention to provide a sliding box type pen base computer which effectively eliminate the aforesaid problems.

DETAILED DESCRIPTION OF THE PREFERRED EMBODIMENT

Figure 1:
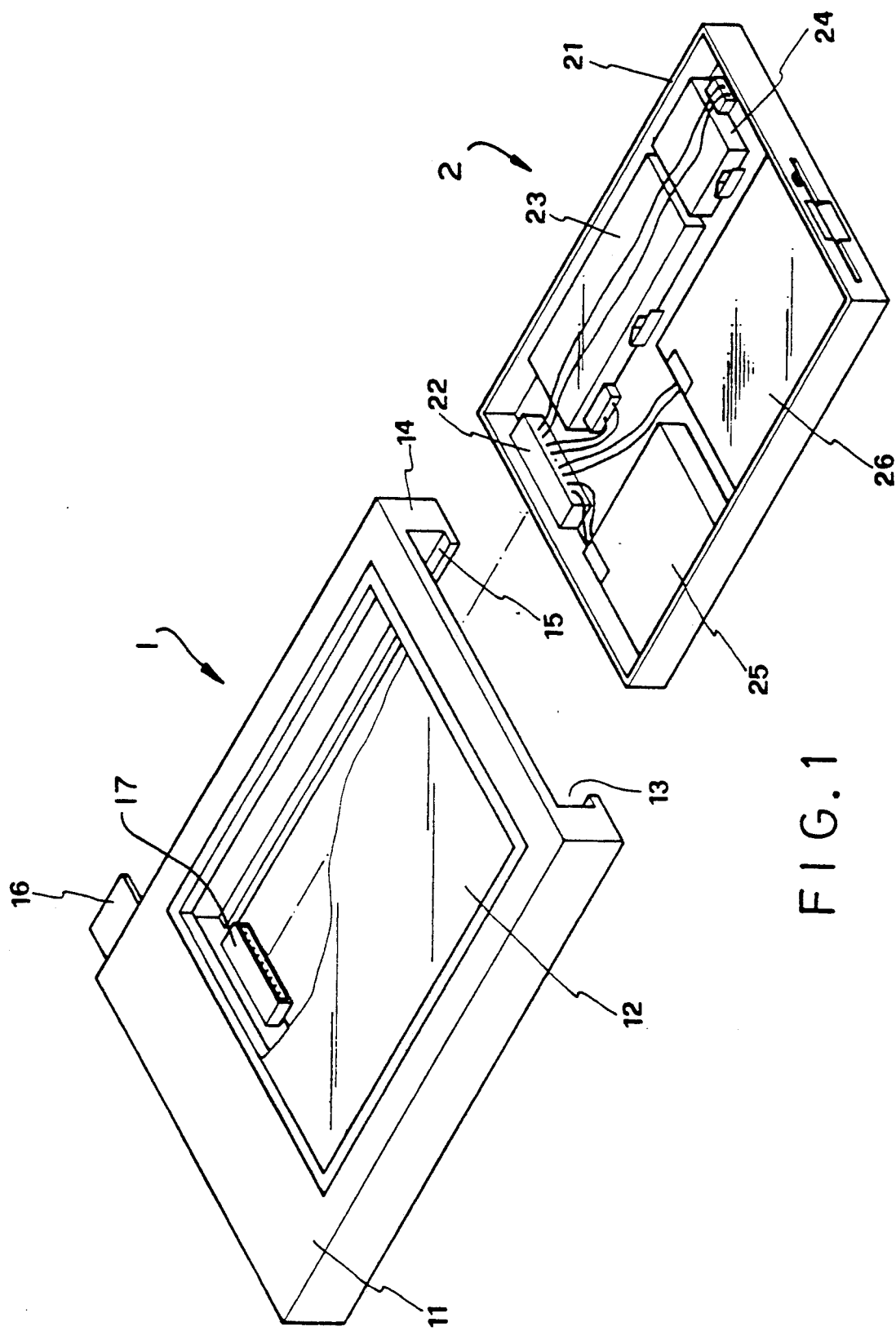
FIG. 1 is an exploded view of the preferred embodiment of the sliding box type pen base computer of the present invention.

Referring to the annexed drawing in detail, the present invention is generally comprised of a base 1 and a sliding box 2. The base 1, which is made in a flat, rectangular shape, comprises a flat top formed of a mother board 11 and a liquid crystal display (LCD) 12 and supported on two longitudinal side stands 14, and a connector 17 for electrically connecting the sliding box 2,. The side stands 14 of the base 1 define therebetween a receiving chamber 13 for inserting the sliding box 2, and have inward flanges 15 at the bottom to support the sliding box 2. The side stands 14 also have retainer elements for securing the sliding box 2 in place and electric contacts for connecting the circuits of the electronic elements inside the sliding box 2 (these are of the know techniques and not within the scope of the present invention). The base 1 further comprises an IC card 16 at one side for connecting an external peripheral equipment.

Referring to FIG. 1 again, the sliding box 2 is made in a rectangular shape having a vertical peripheral wall fitting into the receiving chamber 13. The sliding box 2 comprises a connector 22 which is connected to a connector 17 inside the base 1, when the sliding box 2 has been inserted into the receiving chamber 13, permitting the electric circuit of the sliding box 2 and the electric circuit of the base 1 to be electrically connected. On the inside of the sliding box 2, there is provided a battery box 23, a power supply unit 24, a floppy disk drive 26 and a hard disk drive 25 respectively connected by electric wires. Fastening means may be provided to prevent the sliding box 2 from completely disconnecting from the base 1.

By means of the aforesaid arrangement, the sliding box 2 can be drawn out of the base 1 for conveniently repairing the electronic components therein or adding a CO-ROM, TV tuner or any of a variety of electronic elements or devices thereto. Because the repair cost of the mother board 11 and the LCD 12 is expensive and approximately equal to buying a new one, the base 1 is made in a fixed structure, namely, the mother board 11 and the LCD 12 are not detachable.

What is claimed is:

1. A sliding box type pen base computer comprising:
   a base, said base comprising a mother board and a liquid crystal display (LCD) at the top and supported on two longitudinal side stands, and a connector circuit for connecting an external peripheral equipment, said side stands defining therebetween a receiving chamber and having inward flanges at the bottom; and
   a sliding box movably inserted into said receiving chamber and supported on said inward flanges, said sliding box comprising a battery box, a power supply unit, a floppy disk drive and a hard disk drive on the inside surrounded by a vertical peripheral wall and electrically connected to said base.

* * * * *